United States Patent
Chen et al.

(10) Patent No.: US 8,005,878 B2
(45) Date of Patent: Aug. 23, 2011

(54) PROVIDING PROCESSING INSTRUCTIONS FOR UPDATING SCHEMA

(75) Inventors: Feng Chen, West Melbourne, FL (US); Xiaobo Li, Shanghai (CN); Ko-Chih Liu, Rockledge, FL (US)

(73) Assignee: General Electric Company, Schenectady, NY (US)

( * ) Notice: Subject to any disclaimer, the term of this patent is extended or adjusted under 35 U.S.C. 154(b) by 508 days.

(21) Appl. No.: 12/327,837

(22) Filed: Dec. 4, 2008

(65) Prior Publication Data
US 2010/0145962 A1 Jun. 10, 2010

(51) Int. Cl.
*G06F 17/30* (2006.01)
(52) U.S. Cl. ...................................................... 707/806
(58) Field of Classification Search .................. 707/806, 707/999.1, 999.203
See application file for complete search history.

(56) References Cited

U.S. PATENT DOCUMENTS

| | | | |
|---|---|---|---|
| 7,016,906 B1* | 3/2006 | Janzig et al. | 1/1 |
| 7,194,449 B2* | 3/2007 | Miao | 1/1 |
| 7,730,028 B2* | 6/2010 | Tysowski et al. | 707/610 |
| 2010/0088351 A1* | 4/2010 | Dehmann et al. | 707/803 |

* cited by examiner

*Primary Examiner* — Cheryl Lewis
(74) *Attorney, Agent, or Firm* — Hoffman Warnick LLC; Ernest G. Cusick

(57) ABSTRACT

A system, method and computer program product are disclosed that enable providing processing instructions for updating schema. In one embodiment, the method includes obtaining an updated schema that includes an updated version of a previous schema; identifying a difference between the updated schema and the previous schema; processing the difference to create processing instructions; and providing the processing instructions for implementation into a logical processor, wherein the logical processor processes data defined using the updated schema.

20 Claims, 3 Drawing Sheets

PROVIDING PROCESSING INSTRUCTIONS FOR UPDATING SCHEMA

BACKGROUND OF THE INVENTION

The subject matter disclosed herein relates to a method, system and computer program product for providing processing instructions for updating schema.

BRIEF DESCRIPTION OF THE INVENTION

A system, method and program product are disclosed that enable providing processing instructions for updating schema. In one embodiment, the method includes obtaining an updated schema that includes an updated version of a previous schema; identifying a difference between the updated schema and the previous schema; processing the difference to create processing instructions; and providing the processing instructions for implementation into a logical processor, wherein the logical processor processes data defined using the updated schema.

A first aspect of the invention provides a method comprising: obtaining an updated schema that includes an updated version of a previous schema; identifying a difference between the updated schema and the previous schema; processing the difference to create processing instructions; and providing the processing instructions for implementation into a logical processor, wherein the logical processor processes data defined using the updated schema.

A second aspect of the invention provides a system comprising logic which includes: an obtainer for use in obtaining an updated schema that includes an updated version of a previous schema; an identifier for use in identifying a difference between the updated schema and the previous schema; a processor for use in processing the difference to create processing instructions; and a provider for providing the processing instructions for implementation into a logical processor, wherein the logical processor processes data defined using the updated schema.

A third aspect of the invention provides a program product stored on a computer readable medium, which when executed, performs the following: obtaining an updated schema that includes an updated version of a previous schema; identifying a difference between the updated schema and the previous schema; processing the difference to create processing instructions; and providing the processing instructions for implementation into a logical processor, wherein the logical processor processes data defined using the updated schema.

A fourth aspect of the invention provides a method of generating a system for providing processing instructions for updating schema, the method comprising: providing a computer system operable to: obtain an updated schema that includes an updated version of a previous schema; identify a difference between the updated schema and the previous schema; process the difference to create processing instructions; and provide the processing instructions for implementation into a logical processor, wherein the logical processor processes data defined using the updated schema.

A fifth aspect of the invention provides a method comprising: at least one of providing or receiving a copy of a computer program that is embodied in a set of data signals, wherein the computer program enables a computer system to implement a method of providing processing instructions for updating schema, the method comprising: obtaining an updated schema that includes an updated version of a previous schema; identifying a difference between the updated schema and the previous schema; processing the difference to create processing instructions; and providing the processing instructions for implementation into a logical processor, wherein the logical processor processes data defined using the updated schema.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
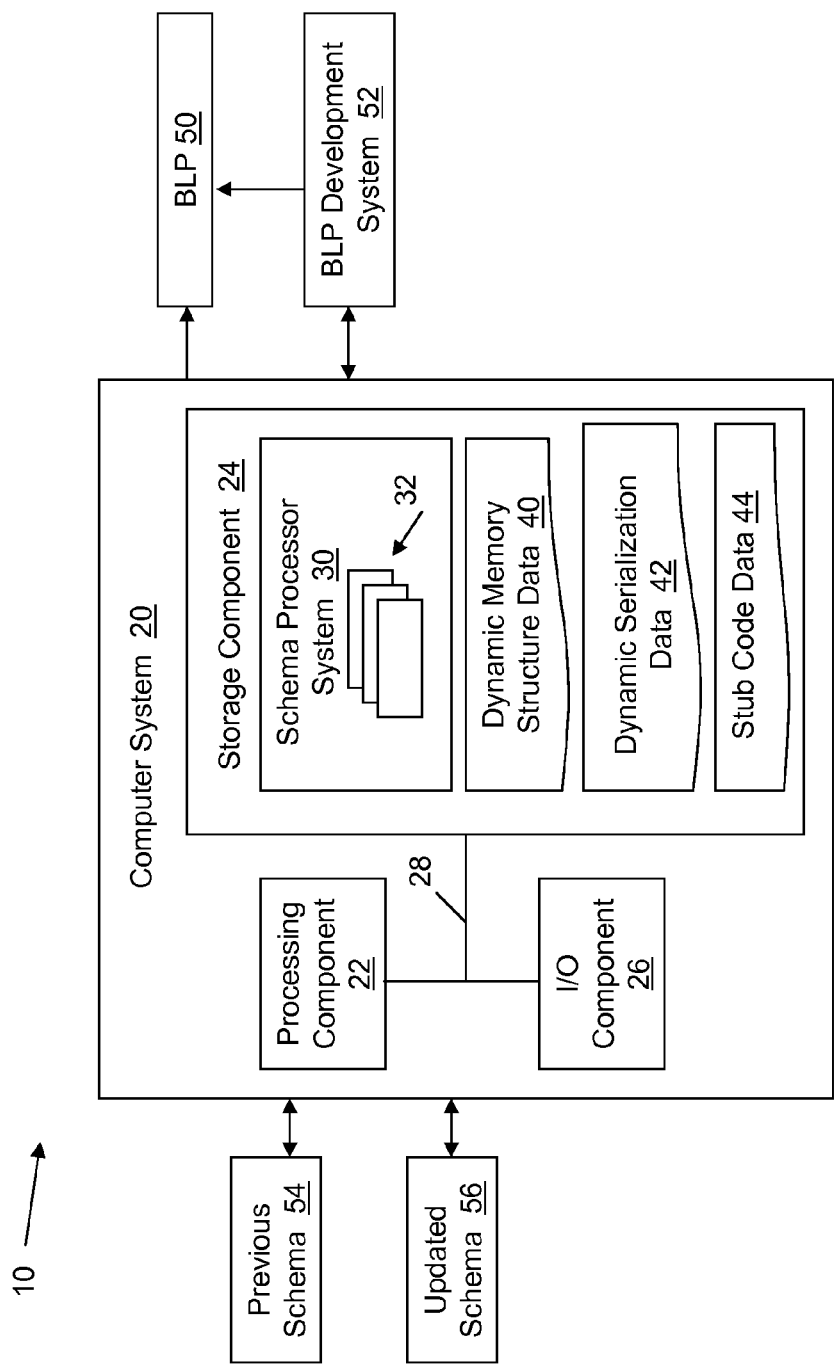
FIG. 1 shows a block diagram of an illustrative environment and computer infrastructure for implementing one embodiment of the invention.

It is noted that the drawings of the invention are not to scale. The drawings are intended to depict only typical aspects of the invention, and therefore should not be considered as limiting the scope of the invention.

In the drawings, like numbering represents like elements between the drawings.

DETAILED DESCRIPTION OF THE INVENTION

As indicated above, aspects of the invention provide a system, method and program product for providing processing instructions for updating schema. As used herein, unless otherwise noted, the term "set" means one or more (i.e., at least one) and the phrase "any solution" means any now known or later developed solution.

Turning to the drawings, FIG. 1 shows an illustrative environment 10 for providing processing instructions for updating schema. To this extent, environment 10 includes a computer system 20 that can perform a process described herein in order to implement updated schema. In particular, computer system 20 is shown including a schema processor system 30, which makes computer system 20 operable to provide processing instructions for updating schema by performing a process described herein.

Computer system 20 is shown in communication with previous schema 54, updated schema 56, business logical processor (BLP) 50, and business logical processor (BLP) development system 52. Interactions between these components and computer system 20 will be discussed in subsequent portions of this application. Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as schema processor system 30, which is at least partially embodied in storage component 24. While executing program code, processing component 22 can process data, which can result in reading and/or writing the data to/from storage component 24 and/or I/O component 26 for further processing. Pathway 28 provides a communications link between each of the components in computer system 20. I/O component 26 can comprise one or more human I/O devices or storage devices, which enable a user to interact with computer system 20 and/or one or more communications devices to enable a user to communicate with computer system 20 using any type of communications link. A user may, for example, be a developer or programmer. To this extent, schema processor system 30 can manage a set of interfaces (e.g., graphical user interface(s), application program interface, and/or the like) that enable human and/or system interaction with schema processor system 30. Further, schema processor system 30 can manage (e.g., store, retrieve, create, manipulate, organize, present, etc.) the data, such as dynamic memory structure data 40, dynamic serialization data 42, and stub code data 44, using any solution.

In any event, computer system 20 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, schema processor system 30 can be embodied as any combination of system software and/or application software. In any event, the technical effect of computer system 20 is to provide processing instructions for updating schema.

Further, schema processor system 30 can be implemented using a set of modules 32. In this case, a module 32 can enable computer system 20 to perform a set of tasks used by schema processor system 30, and can be separately developed and/or implemented apart from other portions of schema processor system 30. As used herein, the term "component" means any configuration of hardware, with or without software, which implements and/or enables a computer system 20 to implement the functionality described in conjunction therewith using any solution, while the term "module" means program code that enables a computer system 20 to implement the functionality described in conjunction therewith using any solution. When embodied in a tangible medium of expression, a module is a component. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device may have only a portion of schema processor system 30 embodied thereon (e.g., one or more modules 32). However, it is understood that computer system 20 and schema processor system 30 are only representative of various possible equivalent computer systems that may perform a process described herein. To this extent, in other embodiments, the functionality provided by computer system 20 and schema processor system 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, schema processor system 30 enables computer system 20 to provide processing instructions for updating schema. Schema processor system 30 may include logic, which may include the following functions: an obtainer 14, an identifier 72, a processor 82 including a dynamic processor 74 and a stub code generator 76, and a provider 92. In one embodiment, system 30 may include logic to perform the above-stated functions. Structurally, the logic may take any of a variety of forms such as a field programmable gate array (FPGA), a microprocessor, a digital signal processor, an application specific integrated circuit (ASIC) or any other structure capable of carrying out the functions described herein. Logic may take any of a variety of forms, such as software and/or hardware. However, for illustrative purposes, schema processor system 30 and logic included therein will be described herein as software. As will be understood from the description, while logic is illustrated as including each of the above-stated functions, not all of the functions are necessary according to the teachings of the invention as recited in the appended claims.

Figure 3:
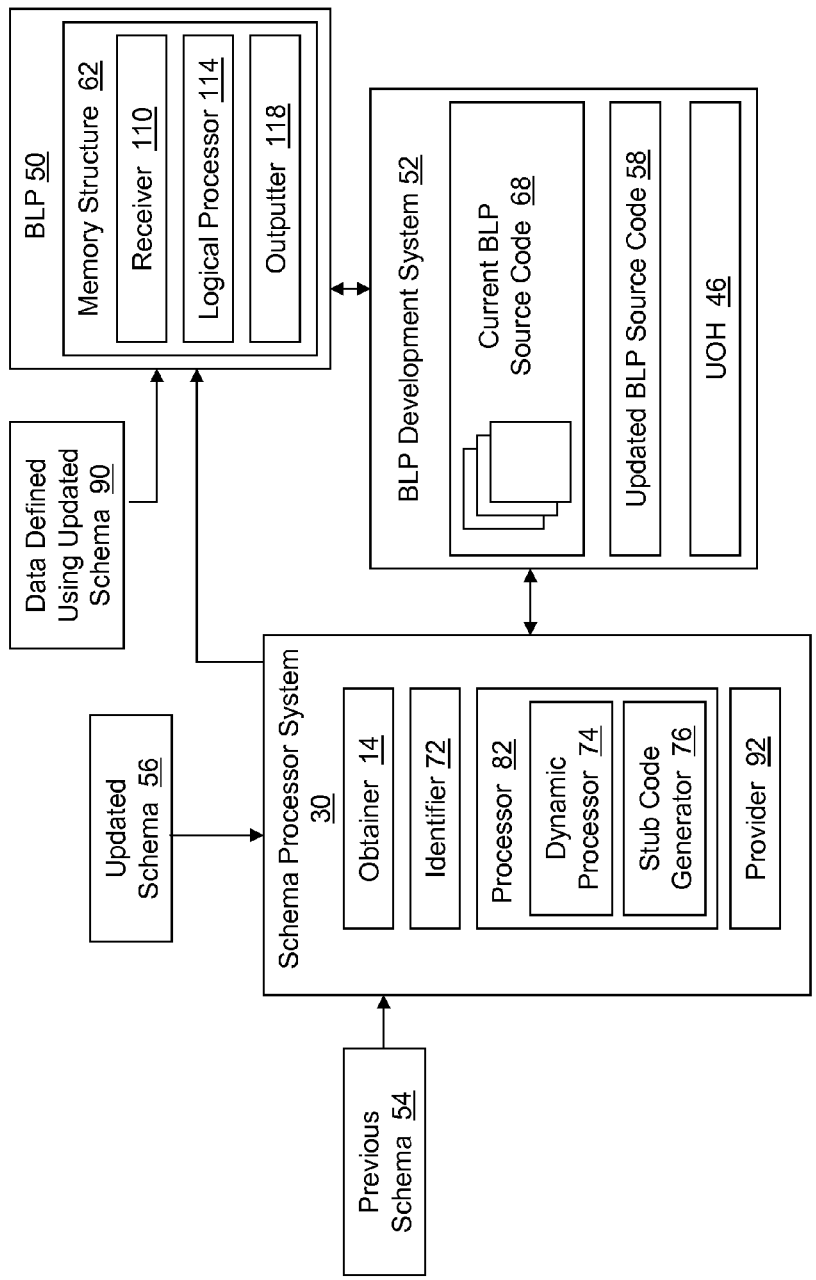
FIG. 3 shows a data flow diagram of sub-components of the system of FIG. 1.

Turning to FIG. 3, and with continuing reference to FIG. 1, a data flow diagram showing sub-components of system 30 is shown. In one embodiment, schema processor system 30 is shown comprising an obtainer 14, an identifier 72, a processor 82 comprising a dynamic processor 74 and a stub code generator 76, and a provider 92. Schema processor system 30 is capable of transmitting data to and from BLP development system 52 through computer system 20. BLP development system 52 may contain current BLP source code 68, updated BLP source code 58, and uniform object handler (UOH) 46. Schema processor system 30 may also transmit data to and from a user through computer system 20. Also shown in FIG. 3, BLP 50 may contain memory structure 62. BLP 50 may transmit data to, and receive data from, BLP development system 52. BLP 50 may also transmit data to a user. Memory structure 62 may contain receiver 110, logical processor 114 and outputter 118. Further, BLP 50 may receive data defined using updated schema 90.

Figure 2:
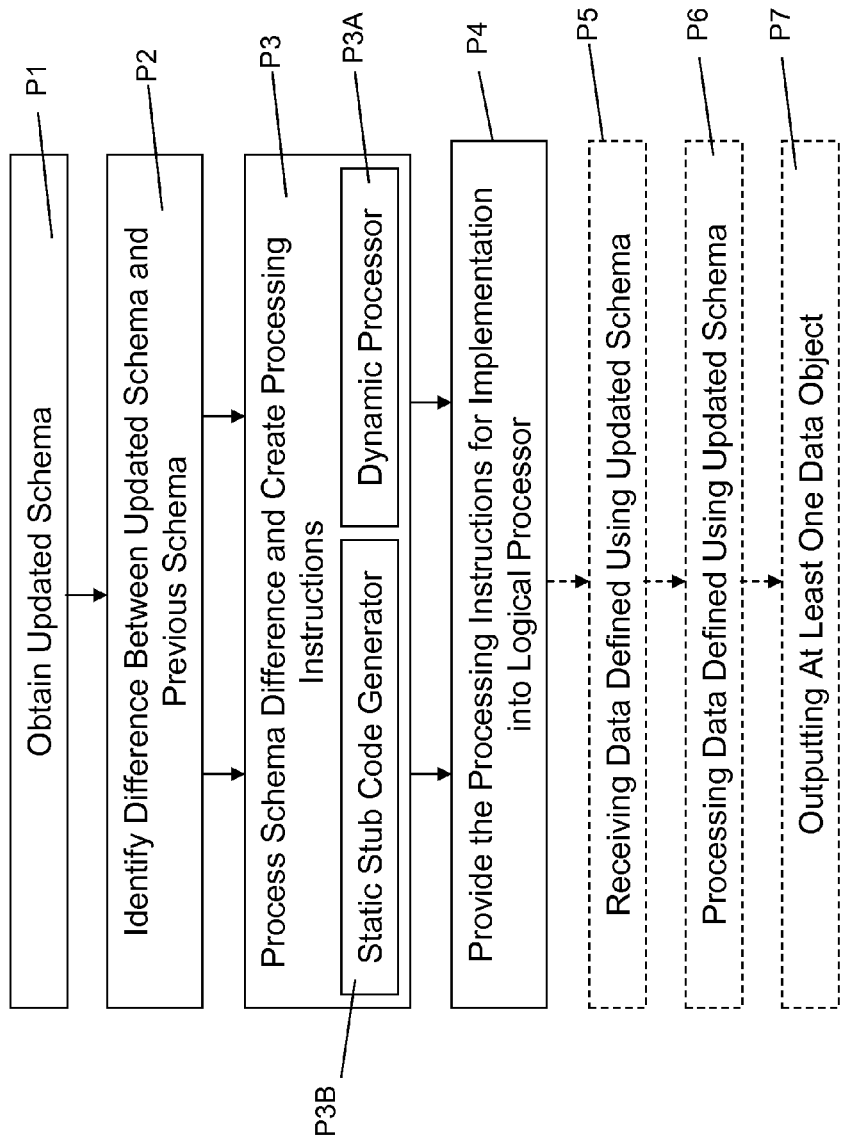
FIG. 2 shows a flow diagram of embodiments of providing processing instructions for updating schema using the system of FIG. 1.

Turning to FIG. 2 and with continuing reference to FIG. 1 and FIG. 3, embodiments of a method for providing processing instructions for updating schema will now be described. In process P1, schema processor system 30 may obtain an updated schema 56 that includes an updated version of a previous schema 54. In one embodiment, schema processor system 30 may comprise an obtainer 14 used in obtaining updated schema 56 that includes an updated version of previous schema 54. Updated schema 56 may be in any schema format now known or later developed. For example, updated schema 56 may be in an extensible markup language (XML), a uniform modeling language (UML) or the like. Further, updated schema 56 may contain attributes about data, and be in the form of metadata.

After obtaining updated schema 56, in process P2, schema processor system 30 may identify a difference between updated schema 56 and previous schema 54. In one embodiment, schema processor system 30 may use identifier 72 to identify a difference between updated schema 56 and previous schema 54. In one embodiment, identifier 72 may parse updated schema 56 from its obtained format into dynamic memory structure data 40 to identify a difference. Dynamic memory structure data 40 may be in any data format now know or later developed. For example, dynamic memory structure data 40 may be a hash map, linked list, or the like. In an alternative embodiment, a user may manually identify a difference between updated schema 56 and previous schema 54 using identifier 72 and dynamic memory structure data 40. In this case, identifier 72 may include an interface for use in identifying a difference between updated schema 56 and previous schema 54. The interface may include a visual display device, an audio output device, an audio/visual display device, or any now known or later developed interface. Further, a user may identify a difference between updated schema 56 and previous schema 54 using any now known or later developed means of identification.

Once identifier 72 has identified a difference between updated schema 56 and previous schema 54, in process P3, processor 82 may process the difference to create processing instructions. Processor 82 may receive and identify syntax rules corresponding to the difference identified in process P2. Processor 82 may then create a set of constraints to be used in place of the syntax rules corresponding to the difference. The set of constraints may relate to program structure, characters, operation order, or the like. Processor 82 may include dynamic processor 74 and stub code generator 76. In one embodiment, in process P3A, dynamic memory structure data 40 may contain simple process logic. Simple process logic may include process logic that may be converted into program code with the use of a code generator. Complex process logic may contain more than one level of various relationships between classes of data, such as: one-to-one, one-to-many and many-to-one. Further, complex process logic may include process logic that is difficult to convert into program code with the use of a code generator. Where dynamic memory structure data 40 contains simple process logic, dynamic memory structure data 40 may be processed by dynamic processor 74. Processing of dynamic memory structure data 40 using dynamic processor 74 will be explained in further detail below. In another embodiment, in process P3B, dynamic memory structure data 40 may contain complex process logic. Complex process logic may include process logic that requires more than a code generator to convert dynamic memory structure data 40 into program code. Such complex process logic may require manual code generation by a user in order to map dynamic memory structure data 40 into program code. Where dynamic memory structure data 40 contains complex process logic, dynamic memory structure data 40 may be processed using stub code generator 76. Processing of dynamic memory structure data 40 using stub code generator 76 will be explained in further detail below.

In one embodiment, in process P3A, dynamic processor 74 processes the difference between updated schema 56 and previous schema 54 to create processing instructions. Dynamic processor 74 may, for example, serialize dynamic memory structure data 40 from its memory format into a file. File, as used herein, may describe any transferrable data object. A file may include one piece or many pieces of data that are capable of being transmitted in their current format to another location. A file may be transmitted between multiple locations, and the locations may be virtual, physical, or the like. Serialization, as used herein, may be converting data stored in memory into a file. Transferring data stored in memory to another data structure, memory, processor, or the like may require the conversion of that data into a file. Serialization provides one method for such a conversion. Once dynamic memory structure data 40 is converted into a file, dynamic processor 74 may take simple process logic contained in that file and convert the simple process logic into program code. Dynamic processor 74 may use, for example, a code generator to convert simple process logic into program code. This program code may be stored in, for example, memory within storage component 24. Dynamic processor 74 may then use serialization to convert this program code stored in memory into a file, for example, into dynamic serialization data 42. Alternatively, dynamic processor 74 may write the program code into dynamic serialization data 42 without the need for serialization from memory. In any case, dynamic processor 74 may provide dynamic serialization data 42 that is compatible with business logical processor (BLP) 50, by providing that data in a file. Once dynamic serialization data 42 is constructed, it may be joined in the same file with processing instructions. Processing instructions instruct BLP 50 on how to implement updated schema 56. After processing instructions are generated, processing instructions may be transmitted to BLP 50 for implementation. Due to the use of serialization, process P3A may occur without the need for a shutdown or restart of computer system 20.

In another embodiment, in process P3B, stub code generator 76 may process the difference between updated schema 56 and previous schema 54 to create processing instructions. Stub code generator 76 may generate stub code data 44 associated with dynamic memory structure data 40. Stub code data 44 may define interactions between default functions of BLP 50 and updated schema 56. In defining these interactions, stub code data 44 enables processing of data defined using updated schema 56. Once developed, stub code data 44 may be integrated into BLP development system 52 for later implementation into BLP 50. BLP development system 52 may integrate stub code data 44 into current BLP source code 68 to create updated BLP source code 58. In this step, a user may manually integrate stub code data 44 into current BLP source code 68 using data definitions provided by a uniform object handler (UOH) 46. UOH 46 may provide a uniform method of mapping classes to data objects. More specifically, UOH 46 may define how BLP 50 makes processing decisions. The definitions provided by UOH 46 may determine how a user integrates stub code data 44 into current BLP source code 68. Once BLP development system 52 integrates stub code data 44 into current BLP source code 58, updated BLP source code 58 is generated and transmitted back to processor 82. Processor 82 may process updated BLP source code 58 and use updated BLP source code 58 to create processing instructions for instructing BLP 50 on how to implement updated schema 56. Processing instructions may then be provided to BLP 50 for implementation.

In process P4, schema processor system 30 may provide the processing instructions for implementation into BLP 50. For example, schema processor system 30 may transmit the processing instructions to BLP 50, to be stored in memory structure 62. In one embodiment, provider 92 may provide the processing instructions to BLP 50, to be stored in memory structure 62. However, BLP 50 may implement processing instructions in any way now known or later developed. Once processing instructions are implemented into BLP 50, BLP 50 is capable of processing data defined using updated schema 90 and outputting at least one data object.

In optional process P5, once BLP 50 has implemented processing instructions related to either dynamic serialization data 42 or updated BLP source code 58, BLP 50 may receive data defined using updated schema 90. In one embodiment, BLP 50 contains receiver 110 for receiving data defined using the updated schema. Data defined using updated schema 90 may be in any form, and for example, may be in the same form as updated schema 56.

In optional process P6, BLP 50 may process data defined using updated schema 90. In one embodiment, logical processor 114 may process data defined using updated schema 90. Logical processor 114 may convert data defined using updated schema 90 into a data object using processing instructions supplied by schema processor system 30. Data object may be in any form, and for example, may be in the form of an enumeration, an array, a structure, a map, a list, a set or the like.

In optional process P7, BLP 50 may output at least one data object. In one embodiment, outputter 118 outputs at least one data object to a user. Outputting of data objects using this configuration may increase run-time efficiency of BLP 50, by decreasing the need for testing and debugging of BLP 50 when processing data defined using updated schema 90.

In any event, computer system 20 can obtain dynamic memory structure data 40, dynamic serialization data 42, and stub code data 44 using any solution. For example, computer system 20 can generate and/or be used to generate dynamic memory structure data 40, retrieve dynamic memory structure data 40 from one or more data stores, receive dynamic memory structure data 40 from another system, and/or the like.

While shown and described herein as a method and system for providing processing instructions for updating schema, it is understood that aspects of the invention further provide various alternative embodiments. For example, in one embodiment, the invention provides a computer program embodied in at least one computer-readable medium, which when executed, enables a computer system to provide processing instructions for updating schema. To this extent, the computer-readable medium includes program code, such as schema processor system 30 (FIG. 1), which implements some or all of a process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; paper; and/or the like. Further, a copy of the program code can be transitory, e.g., embodied in a modulated data signal having one or more of its characteristics set and/or changed in such a manner as to encode information in the signal.

In another embodiment, the invention provides a method of providing a copy of program code, such as schema processor system 30 (FIG. 1), which implements some or all of a process described herein. In this case, a computer system can generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program embodied in at least one computer-readable medium. In either case, the set of data signals can be transmitted/received using any type of communications link.

In still another embodiment, the invention provides a method of generating a system for providing processing instructions for updating schema. In this case, a computer system, such as computer system 20 (FIG. 1), can be obtained (e.g., created, maintained, made available, etc.) and one or more modules for performing a process described herein can be obtained (e.g., created, purchased, used, modified, etc.) and deployed to the computer system. To this extent, the deployment can comprise one or more of: (1) installing program code on a computing device from a computer-readable medium; (2) adding one or more computing and/or I/O devices to the computer system; and (3) incorporating and/or modifying the computer system to enable it to perform a process described herein.

It is understood that aspects of the invention can be implemented as part of a business method that performs a process described herein on a subscription, advertising, and/or fee basis. That is, a service provider could offer to provide processing instructions for updating schema as described herein. In this case, the service provider can manage (e.g., create, maintain, support, etc.) a computer system, such as computer system 20 (FIG. 1), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method comprising:
    obtaining an updated schema that includes an updated version of a previous schema;
    identifying a difference between the updated schema and the previous schema;
    processing the difference to create processing instructions; and
        providing the processing instructions for implementation into a logical processor, wherein the logical processor processes data defined using the updated schema.

2. The method of claim 1, wherein the obtaining includes obtaining an updated schema including unified modeling language.

3. The method of claim 2, wherein the processing includes converting the updated schema from a unified modeling language into at least one of a resource description framework or an object windows library.

4. The method of claim 1, wherein the processing includes processing using one of a static stub code generator and a dynamic processor.

5. The method of claim 4, wherein the identifying includes determining whether the processing is performed by one of the static stub code generator and the dynamic processor.

6. The method of claim 1, further comprising:
    receiving data defined using the updated schema;
    processing the data defined using the updated schema to create at least one data object; and
    outputting the at least one data object.

7. The method of claim 6, wherein the outputting the at least one data object includes outputting to at least one of: a user and a data storage device.

8. A system comprising logic which includes:
    an obtainer for use in obtaining an updated schema that includes an updated version of a previous schema;
    an identifier for use in identifying a difference between the updated schema and the previous schema;
    a processor for use in processing the difference to create processing instructions; and a provider for providing the processing instructions for implementation into a logical processor, wherein the logical processor processes data defined using the updated schema.

9. The system of claim 8, wherein the updated schema includes unified modeling language.

10. The system of claim 9, wherein the processor converts the updated schema from a unified modeling language into at least one of a resource description framework or an object windows library.

11. The system of claim 8, wherein the processor includes one of a static stub code generator and a dynamic processor.

12. The system of claim 11, wherein the identifier determines whether the processor uses one of the static stub code generator and the dynamic processor.

13. The system of claim 8, wherein the logical processor comprises:
    a receiver for receiving data defined using the updated schema;
    a processor for processing the data defined using the updated schema to create at least one data object; and
    an outputter for outputting the at least one data object.

14. The system of claim 13, wherein the outputter outputs the at least one data object to at least one of: a user and a data storage device.

15. A program product stored on a computer readable storage medium, which when executed, performs the following:
    obtaining an updated schema that includes an updated version of a previous schema;
    identifying a difference between the updated schema and the previous schema;
    processing the difference to create processing instructions;
    providing the processing instructions for implementation into a logical processor, wherein the logical processor processes data defined using the updated schema.

16. The program product according to claim 15, wherein the obtaining includes obtaining an updated schema comprising unified modeling language.

17. The program product according to claim 16, wherein the processing includes converting the updated schema from a unified modeling language into at least one of a resource description framework or an object windows library.

18. The program product according to claim 15, wherein the processing includes processing using one of a static stub code generator and a dynamic processor.

19. The program product according to claim 18, wherein the identifying includes determining whether the processing is performed by the static stub code generator or the dynamic processor.

20. The program product according to claim 15, further comprising:
    receiving data defined using the updated schema;
    processing the data defined using the updated schema to create at least one data object; and
    outputting the at least one data object.

* * * * *